Mar. 20, 1923.

C. F. PEARSON.
FRICTION CLUTCH.
FILED JULY 25, 1921.

1,448,861.

Inventor:
Carl F. Pearson

Patented Mar. 20, 1923.                                              1,448,861

UNITED STATES PATENT OFFICE.

CARL F. PEARSON, OF CHICAGO, ILLINOIS, ASSIGNOR TO CHICAGO MACHINE & MOTOR CO., A CORPORATION OF ILLINOIS.

FRICTION CLUTCH.

Application filed July 25, 1921.   Serial No. 487,251.

*To all whom it may concern:*

Be it known that I, CARL F. PEARSON, a citizen of the United States, residing at Chicago, in the county of Cook and State of Illinois, have invented certain new and useful Improvements in Friction Clutches, of which the following is a specification.

The invention relates to improvements in friction clutches, and more especially to clutches of this character which are well adapted for use in self-propelled vehicles.

The clutch is of the type in which the separable driving and driven members are normally and yieldingly held in driving contact by a compressed spring.

Some of the objects of the invention are to simplify the clutch structure; to reduce the cost of manufacture; to provide a convenient means for opening the clutch, and an accurate and reliable means to adjust the relative position of the parts, and the provision of suitable levers thru which the springs act to maintain the clutch members in driving relation.

Other, further and more specific objects of the invention will become readily apparent, to persons skilled in the art, from a consideration of the following description when taken in conjunction with the drawings, wherein:—

In both views the same reference characters are employed to indicate similar parts.

Figure 1:
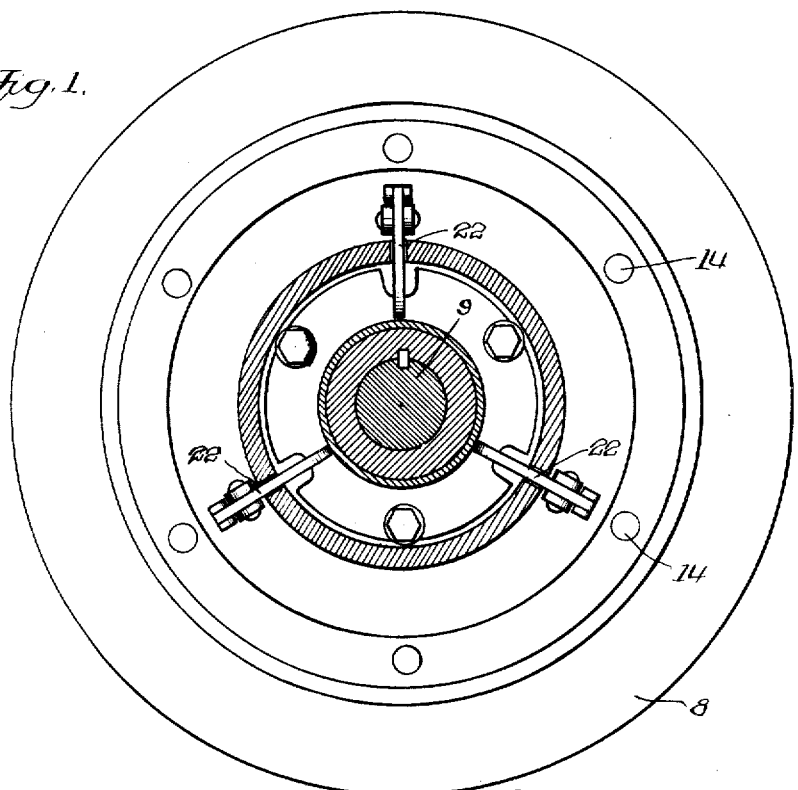
Fig. 1 is a transverse section taken on line 1—1 of Fig. 2.
Figure 2:
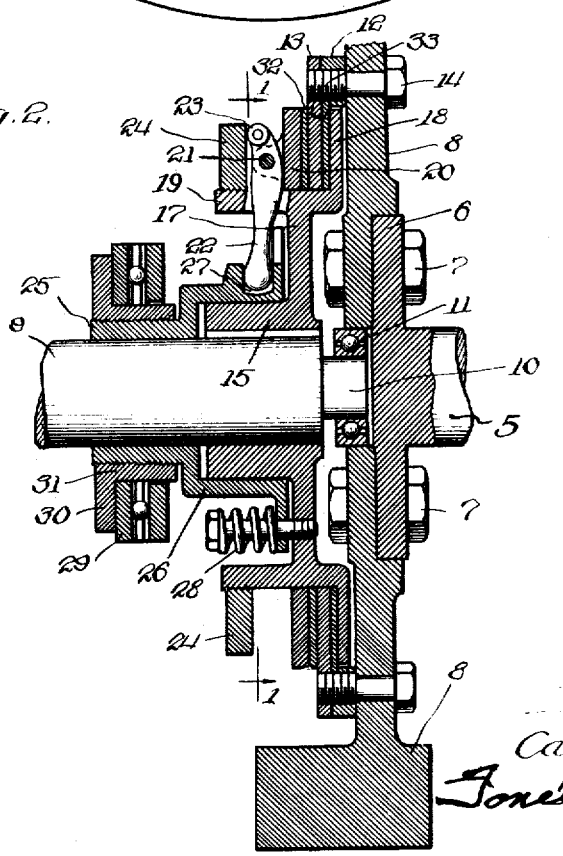
Fig. 2 is a central longitudinal section of the structure.

In the embodiment 5 may be an engine shaft expanded into a flange 6 and connected by bolts 7 to a fly-wheel 8. The driven shaft 9 has a reduced end 10 which is supported by a ball bearing structure 11 located at the axis of the fly-wheel.

Secured to the fly-wheel, near the outer circumferential limits, is a ring 12, arranged to space away from the surface of the fly wheel a flat ring 13 which latter ring serves as one of the clutch members. The bolts 14 hold both of the rings in their positions with respect to the fly-wheel.

One of the driven clutch operating members consists of the sliding hub 15, having a disk portion 17 terminating in a flat ring 18. The flat ring 18 is contained between the clutch member 13 and the fly-wheel, and the hub 15, with the flat ring 18, is slidable on the shaft 9. The disk 17 terminates in another concentric hub 19 from which the flat ring 18 directly extends.

Slidable on the hub 19 is another clutch member consisting of a flat ring 20. Pivoted to the ring 20, as at 21, are a plurality of radially-extending clutch-closing levers 22, each having an end 23 beyond its fulcrum which is outturned to make contact with an axially adjustable flat ring 24, threaded on the hub 19 and axially adjustable thereon, serving as an abutment to regulate the operation of closing the clutch.

A hollow hub 25 is slidable on the shaft 9 and there is provided a larger, integral portion 26 that overlies the hub 15. The part 26 is provided with sockets 27, within which the inner ends of the levers 22 normally rest. When the hub 25 and the integral portion 26, are moved to the left the inner ends of the levers 22 are idly moved, while the effect of the springs on the clutch members to hold them closed is removed and the clutch is opened. When the hubs 25 and 26 are released the outer ends 23 of the levers 22 bear against the abutment ring 24 and the springs 28 cause the ring 20 and the ring 18 to firmly, but yieldingly, engage the driving clutch member 13, and in this closed position the clutch members normally remain and are only separated when tension of the springs is removed therefrom as when the members 25 and 26 are moved to the left, as heretofore described.

A ball bearing thrust receiving structure 29 may be located between a suitable lever for separating the clutch members and the rim 30 of the sleeve 31.

Rings 32 and 33 of yielding material may be introduced, as shown, between the respective clutch members to prevent actual metallic contact of said members and to offer additional frictional resistance therebetween.

Having described my invention what I claim as new and desire to secure by Letters Patent, is:—

A clutch comprising a driving wheel; a ring laterally spaced therefrom forming a driving member of the clutch; a driven shaft; a hub slidable thereon radially terminating in a flat ring, located between the driving member and said wheel; a slidable ring on the other side of said driving clutch member; a plurality of radially disposed levers pivoted to the latter slidable ring, each lever having an outer end extending beyond its pivotal point; an axially adjustable abutment for the extended ends of said levers; a sliding hub, overlying the first mentioned hub, having sockets containing the inner ends of said levers; a spring acting on the inner ends of said levers to normally hold the clutch members in driving engagement and means to discontinue driving engagement of said clutch members by compressing the springs.

In testimony whereof I hereunto subscribe my name.

CARL F. PEARSON.